United States Patent [19]

Ferrigno

[11] 3,853,573

[45] Dec. 10, 1974

[54] FLUXING AGENT MODIFIED PIGMENTARY COMPOSITIONS

[76] Inventor: Thomas Howard Ferrigno, 29 Clover Hill Cir., Trenton, N.J. 08638

[22] Filed: July 5, 1973

[21] Appl. No.: 376,460

Related U.S. Application Data

[63] Continuation-in-part of Ser. No. 306,936, Nov. 15, 1972.

[52] U.S. Cl. .......... 106/288 B, 106/306, 106/308 B
[51] Int. Cl. ............................................. C09c 1/28
[58] Field of Search ............ 106/288 B, 306, 308 B

[56] References Cited
UNITED STATES PATENTS 3,108,885   10/1963   Dunseth ..................... 106/288 B Primary Examiner—Delbert E. Gantz
Assistant Examiner—Jacqueline V. Howard
Attorney, Agent, or Firm—Sperry and Zoda

[57] ABSTRACT

Pigmentary compositions are produced by calcining agglomerated particles of anhydrous silicates bonded together by inorganic binders with the aid of fluxing agents. In some compositions hydrated silicates and inorganic opacifying agents are included. The pigmentary compositions are characterized by a specific gravity which is from about 5 to 40 percent below that of the constituents of which the agglomerates are composed and have a water absorption not exceeding about 10 percent.

19 Claims, No Drawings

FLUXING AGENT MODIFIED PIGMENTARY COMPOSITIONS

This application is a continuation-in-part of application Ser. No. 306,926 filed Nov. 15, 1972.

FIELD OF INVENTION

As pointed out in said copending application, comminuted anhydrous minerals, such as feldspar and other anhydrous silicates generally have refractive indices which do not differ markedly from those of many oils, waxes and organic liquids and polymers used in paints, plastics, adhesives, rubber and the like. Therefore, when such minerals are dispersed in such media they contribute very little to the opacity of the compositions in which they are employed. As a result, it has heretofore been necessary to add relatively expensive pigments to such compositions in order to impart a distinctive color or opacity thereto.

In accordance with the invention of said prior application, anhydrous silicate minerals are finely ground and mixed with an inorganic binder after which they are formed into agglomerates composed of numerous particles of the mineral and then calcined to produce pigmentary compositions which possess internal voids and present multiple reflecting surfaces imparting a white color and a high degree of opacity thereto. The specific gravity of the pigmentary compositions is substantially less than that of the materials of which they are composed and they have water absorptions below about 10 percent. The compositions are therefore adapted for use as pigments in liquid, plastic or solid media having refractive indices approximating those of the anhydrous minerals used in forming the same.

As pointed out in copending application Ser. No. 356,055, additional opacifying agents may be combined with the minerals used in forming the pigmentary compositions to impart a more brilliant white or other color thereto if desired. Further, as disclosed in copending application Ser. No. 376,461 both anhydrous and hydrous silicate minerals may be combined to advantage is forming novel pigmentary compositions.

It has now been discovered that other and improved pigmentary compositions may be produced by combining a fluxing agent composed of one or a combination of metal oxides with the mineral materials and binder prior to the calcining of the agglomerate. In this way stronger and less friable products are obtained and the temperatures at which the calcining step is carried out may be reduced.

Ordinarily when practicing the present invention, the proportions of the constituents employed are maintained within the following general and preferred ranges in parts by weight.

|  | General | | Preferred | |
| --- | --- | --- | --- | --- |
|  | Min. | Max. | Min. | Max. |
| Anhydrous Silicates | 30 | 98.5 | 39 | 93 |
| Hydrous Silicates | 0 | 40 | 0 | 30 |
| Inorganic Colorants | 0 | 5 | 0 | 5 |
| White Opacity Modifiers | 0 | 20 | 0 | 10 |
| Inorganic Binders | 1 | 10 | 2 | 6 |
| Fluxing Agents | 0.5 | 10 | 5 | 10 |

While it is generally preferred to use feldspar in producing the pigmentary compositions of the present invention, it is possible to use substantially any anhydrous silicate such as silica, alkali metal silicates such as berylium, magnesium and calcium silicates, alumino silicates, alkali alumino-silicates such as lithium, berylium, barium, sodium, magnesium, calcium and potassium alumino-silicates and mixtures thereof. The refractive indices of the anhydrous silicates generally range from about 1.47 to 1.74 and their softening points range from about 1,000° C to 1,890° C.

The hydrous silicates which may be used can be chosen from a great variety thereof including the phyllosilicates, sorosilicates, the opal and zeolite group of tectosilicates, the amphibole group of inosilicates, perlite; siliceous volcanic glass which are hydrous derivatives of alkali feldspar and silica containing 2 to 6 percent water of constitution, and nonswelling montmorillonites having polyvalent cations such as calcium, magnesium, and others. The hydrous silicates have refractive indices ranging from about 1.43 to 1.75 and softening points ranging from about 900° C to 1,200° C.

The inorganic binders used may be soluble silicates; glassy phosphates described in U.S. Pat. No. 3,127,238; expanding lattice montmorillonites or the like.

In addition to the inorganic binder employed, a further agent referred to herein as a "fluxing agent" is used in combination to function as a high temperature bonding agent which may not in all cases actually act upon the anhydrous or other mineral components. Thus, it has been observed that certain glasses, frits and the like soften at temperatures below those of the anhydrous minerals and tend to bond the particles at their points of contact. Some softening effect on the anhydrous minerals may occur but the important function of the fluxing agent is to effect a strong permanent bonding of the mineral particles.

The fluxing agents employed are capable of wide variation but in general, are selected from those metal oxides and metal oxide complexes which melt at temperatures below the melting point of the anhydrous mineral of the composition. Typical of such metal oxides are boric oxide, compounds of boric oxide, lead oxide, barium oxide, and complex combinations of various metal oxides such as glasses, frits, and the like. A particularly suitable fluxing agent is borax which is sodium borate $Na_2O.2B_2O_3$ in either a hydrated or anhydrous form.

When colored opacifying agents or modifiers are employed, substantially any suitable inorganic colorant may be used. Such white opacifiers as titanium dioxide, zirconium oxide, zirconium silicate, zirconium double silicates, zinc oxide, antimony oxide and tin oxide are representative whereas color producing agents such as iron oxide, mangeanese oxide, lead chromate, ultramarine and ceramic colorants of various and complex composition may be used.

In producing the pigmentary compositions, the mineral materials are used as fine particles. The feldspar or other anhdyrous silicates should have an average particle size of less than 100 microns and preferably an average particle size in the range of about 2 to 20 microns. The hydrous silicates, when used, may be employed in a somewhat wider range of average particle sizes, say, from about 0.5 to 100 microns depending upon the size of the agglomerate to be formed, but also should be within the range of average particle size of the anhydrous mineral. Some latitude must necessarily be applied to regulate the packing of the various sizes and shapes of particles to achieve final densities within the scope of this invention.

In producing the agglomerates the mineral materials employed are mixed together and when the fluxing agent is of a water insoluble nature it is finely ground and also mixed with the minerals and water. The bonding agent, and the fluxing agent, when water soluble, may be added in the form of an aqeuous solution to uniformly distribute the binder and flux throughout the mixture in any suitable manner. The fluxing agent may also be applied to previously formed agglomerates as solutions or dispersions to effect a more complete surface fusion.

The resulting mixture is then formed into beads, pellets, spheroids, or compacts, each of which contains numerous particles of the mineral material adhering together. This may be accomplished by spraying the aqueous solution of binder, and flux when a soluble, into the dry mixture as it is fed into the pan of a disc pelletizer or in a tumbling drum or by spray drying a fluid mixture of all of the materials. The plastic mixture may be passed through an extruder or other compacting or forming equipment followed by a sizing or pressing operation to obtain agglomerates of the desired size or shape.

The agglomerates are then dried by any suitable means until the free water content is reduced to from 0 to 10 percent by weight and the dried or semi-dried product is calcined at a tmeperature approaching the melting point of the lowest melting constituent of the mixture or until incipient fusion (permanent bonding) of the particles in the agglomerate takes place. In general, the calcining temperatures may range from about 800° C to 1,200° C depending on the minerals used and, in part, on the amount and type of the fluxing agent used and the duration of the calcining operation. It is preferable to limit the calcining treatment to a few minutes, say from about 5 to 15 minutes for reasons of economy and expediency.

The finished pigmentary compositions thereby obtained may vary in size from about 20 microns to 1 centimeter depending on the size of the mineral particles of which they are composed and the product in which they are to be employed. For use in paints and the like, they may vary from about 20 to 50 microns but in thicker sections, such as plastics, castings, caulks and the like, they may have sizes up to one centimeter although a more efficient range would be from about 100 to 1,000 microns.

The individual pigmentary compositions each contain numerous particles of the mineral and optionally added agents, and have voids or cavities therein, as evidenced by the fact that the specific gravity of the pigmentary composition is found to be only about 60 to 95 percent of that of the non-volatile (at 100°C) material of the composition. At the same time the pigmentary compositions have minor surface porosities as demonstrated by their limited water absorption. A water absorption of less than 10 percent and below 5 percent is preferred. Because of their low water absorption characteristics the pigmentary compositions of the present invention may be used to advantage in paints or the like without excessive absorption of liquid vehicle which might cause an undesirable increase in viscosity.

The numerous internal facets of each individual pigmentary composition present a multitude of light reflecting surfaces. When a minor proportion of opacifying agent is used and is uniformly distributed throughout the pigmentary composition, it serves to supplement and materially increase the opacity of the product. As a result, the products provide high opacities and are characterized by a brilliant white or other color and appearance despite the fact that the major portion of the composition is composed of minerals having relatively low refractive indices. Moreover, the opacity of the product and its color is retained when dispersed in liquid or other media having a refractive index approximately the same as that of the anhydrous mineral therein. For purposes of comparison of the whiteness of white pigmentary compositions of the present invention, they are placed upon a white opaque structure having a reflectance of about 84 percent at 550 millimicrons, the average wavelength of visible light. Those appearing equal or whiter are considered to be white for purposes of the present invention. Other standards prevalent in the paint industry, for example, may be used in prescribing products having colors due to differing reflectances in the visible light range.

In order to illustrate typical methods and products in accordance with the present invention, the following examples are cited:

EXAMPLE I

A series of products were produced wherein the pigmentary composition contained only anhydrous silicate, a bonding agent and a fluxing agent as follows:

| Expt. No. | Anhydrous Mineral, Wt. | | Flux, | Wt. | Specific Gravity | | | % WA | Min/°C |
|---|---|---|---|---|---|---|---|---|---|
| | | | | | Actual | Calcu. | % Red. | | |
| 18-1 | Feldspar | 96 | None | | 2.26 | 2.63 | 14.1 | 0 | 10/1150 |
| 18-2 | do. | 86 | Borax Glass, | 10 | 1.80 | 2.60 | 30.8 | 3.7 | 10/900 |
| 18-12 | Silica | 86 | do. | 10 | 1.67 | 2.61 | 36.0 | 7.1 | 10/1100 |
| 19-1 | Feldspar | 86 | $H_3BO_3$ | 18.2 | 1.75 | 2.52 | 30.6 | 0 | 10/1000 |
| 19-2 | do. | 91 | do. | 9.1 | 2.02 | 2.57 | 21.4 | 4.0 | 10/1000 |
| 19-3 | do. | 95 | do. | 1.8 | 2.26 | 2.62 | 13.8 | 1.0 | 10/1100 |
| 19-4 | Feldspar Silica | 43 43 | do. | 18.2 | 1.87 | 2.52 | 25.8 | 0 | 10/1000 |

In each of the foregoing tests the agglomerates were hand formed and contained 4 percent of Bentolite L (a product of Georgia Kaolin Company) adjusted to 5 percent $Na_2O$ as the inorganic binder; the feldspar was a natural mixture of albite, orthoclase and anorthite ground in a pebble mill and having an average particle size of 11 microns, a specific gravity of 2.64 and an average refactive index of 1.53. The silica was a natural quartz ground to an average particle size of 10 microns and having a specific gravity of 2.65 and a melting point of 1,722° C. The "borax glass" was calcined sodium borate decahydrate produced by U.S. Borax Company, ground to 100 percent through a 200 mesh National Bureau of Standards sieve, and having a specific gravity of 2.37. The boric acid on calcining yielded 10.0 parts of boric oxide having a specific gravity of 1.85 for each 18.2 parts of the boric acid so that

| Anhyd. Mineral | Expt. No. | Flux Agt., % | Min/ C | Specific Gravity | | | % Water Absp. |
|---|---|---|---|---|---|---|---|
| | | | | Actual | Calc. | % Redn. | |
| Fspar. | 12–3 | None | 10/1100 | 2.31 | 2.61 | 11.5 | 3.3 |
| Fspar. | 18–3 | Borax Glass, 10 | 5/1100 | 2.04 | 2.58 | 21.0 | 4.7 |
| Silica 50% Fspar. 50% | 26–2 | None | 10/1150 | 2.40 | 2.61 | 8.1 | 13.9 |
| Silica 50% Fspar. 50% | 26–3 | Boric Acid, 18.2 | 10/1150 | 1.92 | 2.51 | 23.4 | 1.7 | in Expt. 19-1 above the boric oxide concentration was 10 parts by weight, in Expt. 19-2 it was 5 parts by weight, in Expt. 19-3 it was 1 part by weight, and in Expt. 19-4, 10 parts by weight.

It will be noted that the reduction in specific gravity was much greater in the examples using a fluxing agent than in the control of Expt. 18-1 except for Expt. 19-3 wherein only 1 part of fluxing agent was used. However, in each instance the calcining temperature was lower and in Expt. 18-2 a reduction in temperature of 250° C was effected. In Expt. 18-12, wherein silica alone was used as the anhydrous mineral, a very satisfactory product having limited water absorption was obtained whereas a similar test without the fluxing agent resulted in a friable product having a very high water absorption in which the silica particles were not effectively consolidated.

EXAMPLE II

In further tests using feldspar and 4 percent glass H as an inorganic binder (a glassy polyphosphate produced by FMC Corporation having 21 phosphorous atoms per molecule and a specific gravity of 2.45) the following results were obtained:

| Expt. No. | Borax Glass Wt. | Min/C | Specific Gravity | | | % Water Absorp. |
|---|---|---|---|---|---|---|
| | | | Actual | Calcu. | Reduc.% | |
| 18–6 | None | 5/1150 | 2.28 | 2.63 | 13.3 | 0 |
| 18–7 | 10 | 10/900 | 1.80 | 2.60 | 30.8 | 1.2 |

Thus, important reductions in the calcining temperature and in the specific gravity of the pigmentary composition were attainable.

EXAMPLE III

In the following tests 60 parts by weight of an anhydrous silicate were mixed with 40 parts by weight of a hydrous silicate in the form of Al-Sil-Ate LO which is a product of Freeport Kaolin Company consisting of a water-fractionated kaolinite of the phyllosilicates having an average particle size of 3.5 microns, an average refractive index of 1.56 and a specific gravity of 2.58. The inorganic binder consisted of 4 percent Bentolite L adjusted to 5 percent $Na_2O$.

Even when modified with kaolinite, the fluxing agents again exhibit exceptional reduction of specific gravity with acceptable water absorption. All have a very high order of opacity by the test consisting of immersion in tricresyl phosphate and viewing printing beneath the breaker containing the dispersion.

EXAMPLE IV

| Expt. No. | Composition, % | | Min/C | Specific Gravity | | | % Water Absorp. |
|---|---|---|---|---|---|---|---|
| | | | | Actual | Calc. | % Redn. | |
| 26–7 | Feldspar | 40 | 10/1150 | 2.55 | 2.78 | 8.4 | 8.8 |
| | Al-Sil-ate | 38 | | | | | |
| | Tam 418 | 20 | | | | | |
| | Bentolite L | 2 | | | | | |
| 26–5 | Feldspar | 18 | 10/1150 | 2.02 | 2.73 | 26.0 | 1.7 |
| | Silica | 18 | | | | | |
| | Al-Sil-Ate | 30 | | | | | |
| | Tam 418 | 20 | | | | | |
| | Boric Acid | 18.2 | | | | | |
| | Bentolite L | 4 | | | | | |

Multiple modification with kaolinite and zirconium silicate (Tam 418) in Expt. 26-7 indicates that a somewhat higher temperature would have been required to reduce the water absorption, although all properties are within acceptable limits. Expt. 26-5 represents an even greater departure since the anhydrous mineral is only 36 parts, half of which is silica. The specific gravity reduction and water absorption are again considerably superior even though calcining was conducted at the same temperature.

EXAMPLE V

Corning 7740 was made with the required materials to yield 81 percent $SiO_2$, 2 percent $Al_2O_3$, 13 percent $B_2O_3$ and 4 percent $Na_2O$, and ground to 100 percent finer than 44 microns. This glass has a melting point of 820° C and a specific gravity of 2.25. Feldspar was the anhydrous mineral in both experiments with 4 percent Bentolite L as before for binder. 10 parts of the ground glass were substituted for feldspar in Expt. 18-15.

Note that the simple replacement on 10 parts of feldspar by the Corning 7740 glass resulted in much greater specific gravity reduction along with lower water absorption. Other types of glass have provided similar results.

In addition to the various fluxing agents cited in the foregoing examples, it is possible to use many other mixtures of metal oxides in the form of glasses, frits, and eutectic mixtures prepared by melting or calcining to obtain a uniform composition and grinding to a suitable size for admixture with the silicate minerals employed.

| Expt. No. | Flux. Agt. | Min/C | Specific Gravity | | | % Water Absorp. |
|---|---|---|---|---|---|---|
| | | | Actual | Calc. | % Redn. | |
| 12-2 | None | 10/1100 | 2.37 | 2.63 | 9.9 | 2.2 |
| 18-15 | 10 parts | 10/1100 | 2.14 | 2.59 | 17.4 | 1.0 |

It will thus be apparent that the pigmentary compositions of the present invention are capable of wide variation in composition and properties to adapt them for use in paints, plastics, caulking compounds and the like to impart desired opacities thereto. In view thereof, it should be understood that the particular compositions and procedures described above and cited by way of examples are intended to be illustrative only and are not intended to limit the scope of the invention.

I claim:

1. A pigmentary composition comprising calcined agglomerates consisting essentially of the following constituents in parts by weight:

| | | | |
|---|---|---|---|
| Anhydrous Silicate Mineral | from | 30 to | 98.5 |
| Hydrous Silicate Mineral | from | 0 to | 40.0 |
| Inorganic Colorant | from | 0 to | 5.0 |
| White Opacity Modifier | from | 0 to | 20.0 |
| Inorganic Binder | from | 1 to | 10.0 |
| Fluxing Agent | from | 0.5 to | 10.0 | said anhydrous silicate mineral being in the form of particles having an average size of from about 2 to 100 microns and selected from the group consisting of silica, the silicates of berylium, magnesium and calcium, alumino-silicates, the aluminosilicates of lithium, berylium, magnesium, barium, sodium, potassium and calcium and mixtures thereof;

said hydrous silicates being in the form of particles having an average size of from about 0.5 to 100 microns and selected from the group consisting of phyllosilicates, sorosilicates, opal, the zeolite group of tectosilicates, the amphibole group of inosilicates, perlite, non-swelling montmorillonites and mixtures thereof;

said inorganic colorant is selected from the group consisting of iron oxide, maganese oxide, lead chromate, ultra-marine and ceramic colorants;

said white opacity modifier is selected from the group consisting of titanium dioxide, zirconium oxide, zirconium silicate, zirconium double silicates, zinc oxide, antimony oxide and tin oxide;

said inorganic binder is selected from the group consisting of water soluble silicates, sodium polyphosphates, expanding lattice montmorillonites and mixtures thereof;

said fluxing agent is selected from the group consisting of metal oxides and glassy metal oxide complexes which melt at a temperature below the melting point of the anhydrous silicate mineral;

said agglomerates ranging in size from about 20 microns to 1 centimeter and having a specific gravity at least 5 percent lower than that of the minerals contained in the composition.

2. A pigmentary composition as defined in claim 1 wherein the constituents are present in the following parts by weight

| | | | |
|---|---|---|---|
| Anhydrous Silicate Mineral | from | 39 to | 93 |
| Hydrous Silicate Mineral | from | 0 to | 30 |
| Inorganic Colorant | from | 0 to | 5 |
| White Opacity Modifier | from | 0 to | 10 |
| Inorganic Binder | from | 2 to | 6 |
| Fluxing Agent | from | 5 to | 10 |

3. The composition as defined in claim 1 wherein the anhydrous silicate mineral is selected from the group consisting of feldspar, silica and mixtures thereof.

4. The composition as defined in claim 1 wherein the anhydrous silicate mineral is selected from the group consisting of feldspar, silica and mixtures thereof, the hydrous silicate is a phyllosilicate, the inorganic binder is an expanding lattice montmorillonite and the fluxing agent contains boric oxide.

5. The composition as defined in claim 1 wherein the fluxing agent is selected from the group consisting of metal oxides and glassy metal oxide complexes which melt at a temperature below the melting point of the anhydrous silicate mineral.

6. The composition as defined in claim 1 wherein the water absorption of the composition is less than 5 percent by weight.

7. The composition as defined in claim 1 wherein the anhydrous silicate mineral has an average particle size of from about 2 to 20 microns and the hydrous silicate mineral has an average particle size of from about 0.5 to 20 microns.

8. A composition as defined in claim 1 containing a plurality of particles of silicate mineral having an average particle size within the range of from about 2 to 20 microns.

9. A composition as defined in claim 1 wherein said anhydrous silicate is feldspar.

10. A composition as defined in claim 1 in which said fluxing agent contains boric oxide.

11. A composition as defined in claim 1 wherein said anhydrous silicate is a mixture of feldspar and silica, said fluxing agent contains boric oxide, and said inorganic binder is an expanding lattice montmorillonite.

12. A composition as defined in claim 1 wherein said anhydrous silicate is feldspar, said hydrous silicate is a phyllosilicate, said fluxing agent melts at a temperature below the melting point of the feldspar, and said inorganic bonding agent is selected from the group consisting of water soluble alkali silicates, glassy phosphates and expanding lattice montmorillonites.

13. A composition as defined in claim 1 in which the fluxing agent is selected from the group consisting of metal oxides and complex glassy metal oxide containing materials.

14. The method of producing a pigmentary composition which comprises the steps of mixing from about 30 to 98.5 parts by weight of an anhydrous silicate mineral in the form of particles having an average size of from about 2 to 20 microns and selected from the group consisting of silica, the silicates of berylium, magnesium and calcium, alumino-silicates, the alumino-silicates of lithium, berylium, magnesium, barium, sodium, potassium and calcium and mixtures thereof with from about 0 to 40 parts by weight of a hydrous silicate mineral, in the form of particles having an average size of from about 0.5 to 20 microns and selected from the group consisting of phyllosilicates, sorosilicates, opal, the zeolite group of tectosilicates, the amphibole group of inosilicates, perlite, non-swelling montmorillonites and mixtures thereof, with from about 1 to 10 parts by weight of a fluxing agent selected from the group consisting of metal oxides and metal oxide complexes which melt at a temperature below the melting point of the anhydrous silicate mineral and from about 0.5 to 10 parts by weight of an inorganic binder selected from the group consisting of water soluble silicates, sodium polyphosphorates, expanding lattice montmorillonites and mixtures thereof, forming said materials into agglomerates each containing a plurality of mineral particles and having a size ranging from about 20 microns to one centimeter, drying said agglomerates to reduce the free water content thereof to about 0 to 10 percent by weight of the agglomerates and thereafter calcining said agglomerates at a temperature below the melting point of any of said minerals.

15. The method as defined in claim 14 wherein said anhydrous mineral is selected from the group consisting of feldspar, silica and mixtures thereof.

16. The method as defined in claim 14 wherein about 39 to 93 parts by weight of anhydrous silicate mineral, from about 0 to 30 parts by weight of hydrous silicate mineral, from 0 to 5 parts by weight of inorganic colorant, from about 0 to 10 parts by weight of white opacity modifiers, from about 2 to 6 parts by weight of inorganic binder, and from about 5 to 10 parts by weight of fluxing agent are used.

17. The method as defined in claim 14 wherein said anhydrous silicate mineral is feldspar.

18. The method as defined in claim 14 in which said fluxing agent contains boric oxide.

19. The method as defined in claim 14 wherein said inorganic binder is expanding lattice montmorillonite.

* * * * *